April 19, 1966  L. E. ASKE  3,246,849
MINIATURE TORCH
Filed June 28, 1962  3 Sheets-Sheet 1
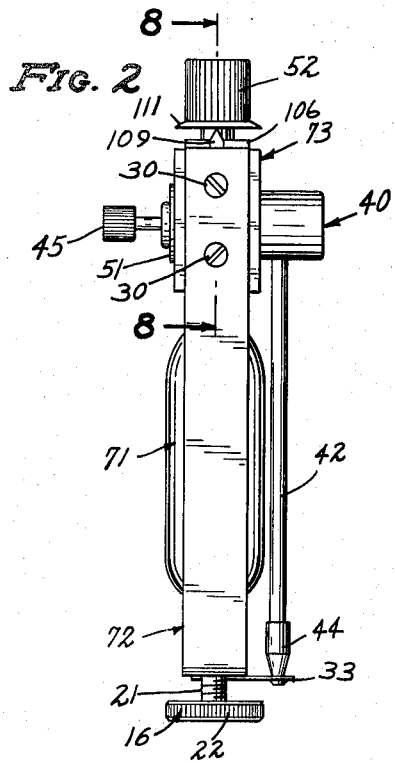
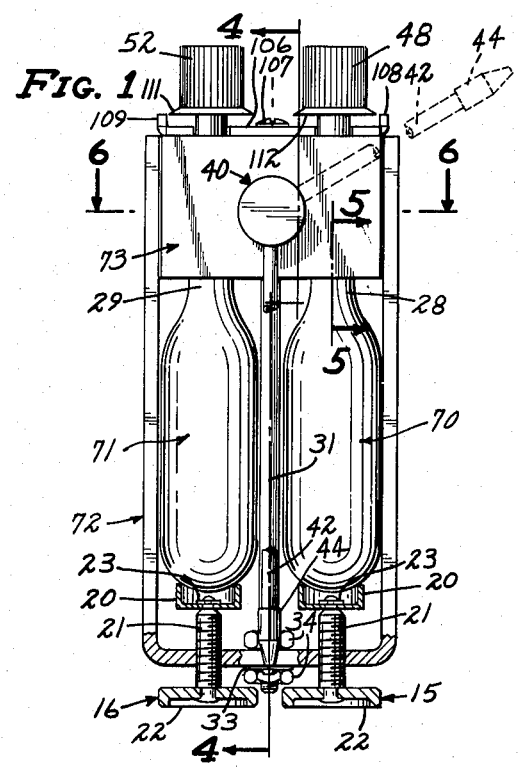
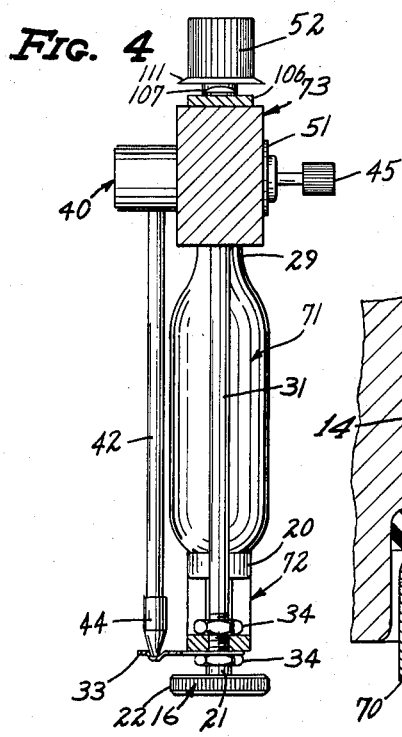
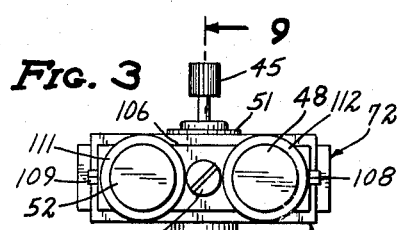
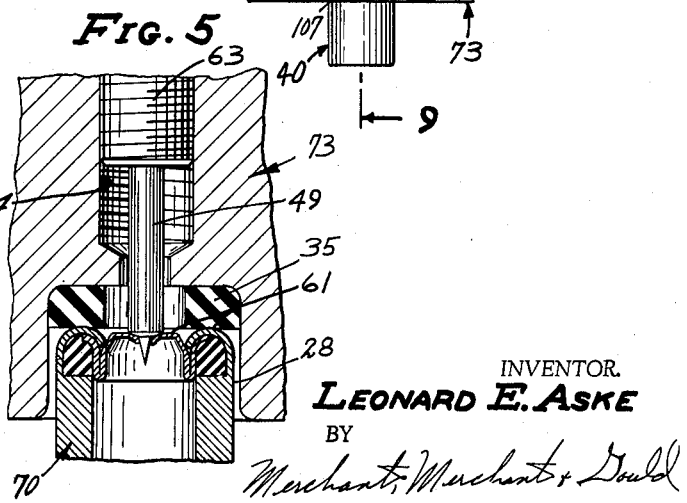
INVENTOR.
LEONARD E. ASKE
BY
Merchant, Merchant & Gould
ATTORNEYS

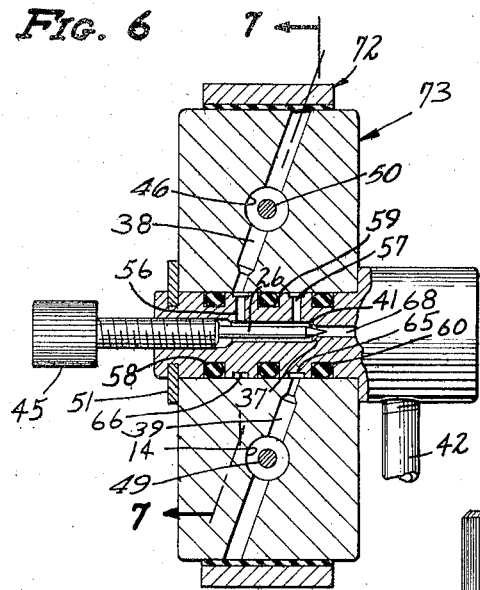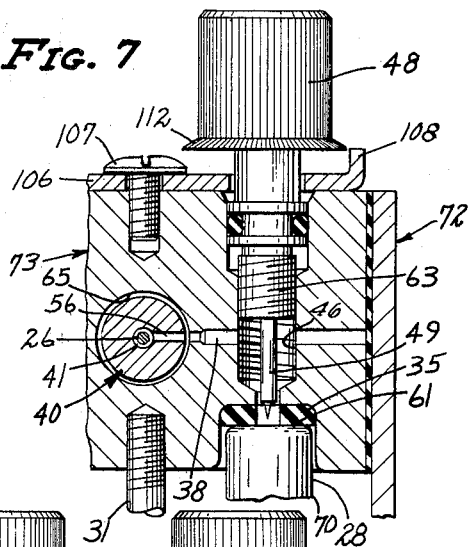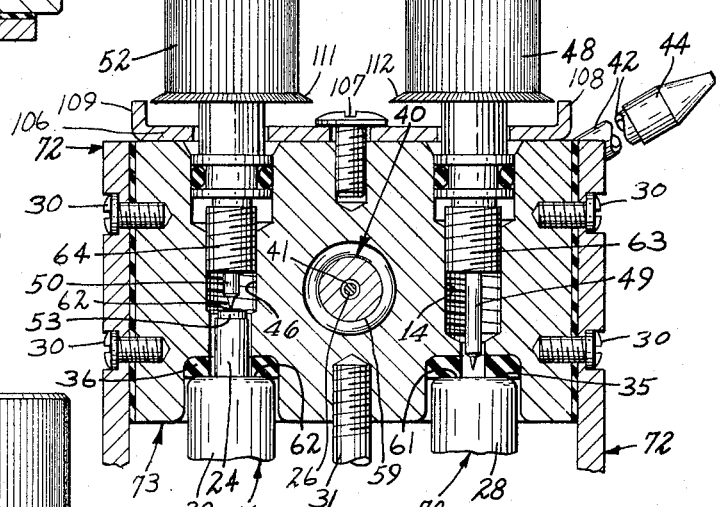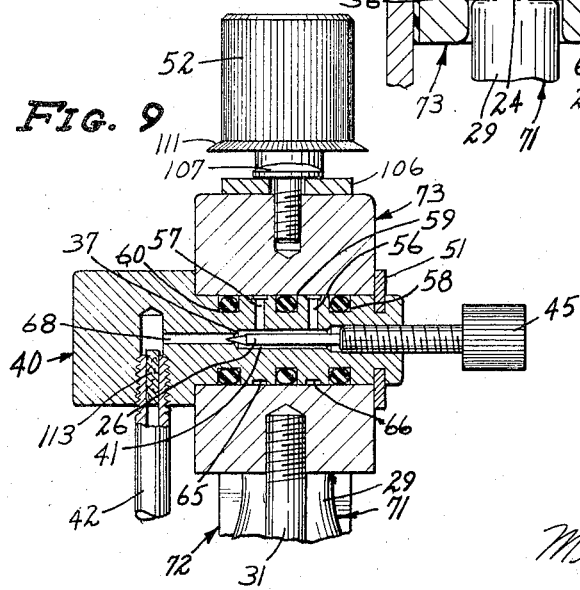

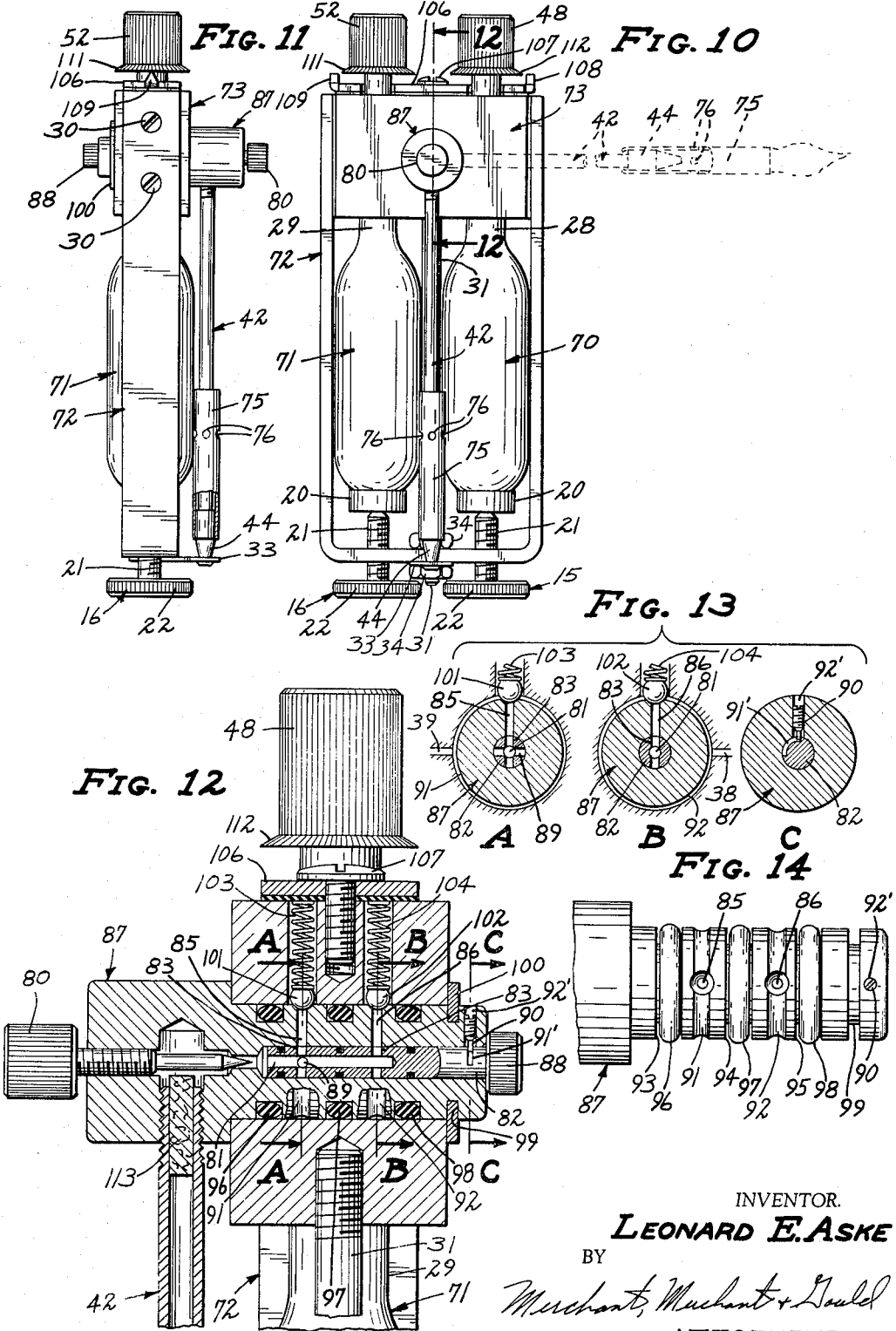

United States Patent Office 3,246,849
Patented Apr. 19, 1966

3,246,849
MINIATURE TORCH
Leonard E. Aske, Minneapolis, Minn., assignor to Printed Circuits, Inc., Minneapolis, Minn., a corporation of Minnesota
Filed June 28, 1962, Ser. No. 205,904
8 Claims. (Cl. 239—304)

This invention relates to a new and very useful miniaturized gas welding apparatus.

More particularly, this invention relates to a miniaturized, self-contained, hand-held gas welding apparatus in which small cylinders of compressed gas (i.e., oxygen and a gaseous, combustible aliphatic hydrocarbon such as butane, acetylene or the like) are utilized as sources of heat. Valve means control feed rates of the gases to a mixing chamber, where a desired combustible mixture of fuel gas is formed and additional valve means control the feed rate of the resulting combustible mixture from the mixing chamber to a blow pipe. The mixture is allowed to escape through a nozzle at the end of the blow pipe where ignition is initiated. The entire, compact apparatus is contained in and positioned upon a small frame.

Optionally, only hydrocarbon gas can be fed through the blow pipe and into an extension pipe fitted over the nozzle end of the blow pipe, such extension pipe having a series of holes in its rearward end which are so arranged that air is aspirated in by venturi action as hydrocarbon gas is passed therethrough, so as to form a desired combustible mixture at the open end of the extension pipe, ready for ignition.

A special feature of the present invention is the mounting head assembly which combines a plurality of separate functions into a single compact unit. Thus, among other things, the mounting head assembly regulates the flow of gas from each cylinder head, mixes them in a mixing chamber and controls the flow of mixed fuel gas from the mixing chamber to the blow pipe, which is rotatably attached to the mounting head assembly.

In accordance with the teachings of this invention, the head end of each cylinder (one of oxygen and one of a combustible fuel gas) is punctured with a special needle arrangement which thereafter serves as a valve means for controlling the quantity of gas fed from each so-punctured cylinder to the mixing chamber. The mixing chamber itself is contained in a special rotary manifold arrangement seated in the mounting head. By rotation of this rotary manifold, the blow pipe is positioned in space, for the rearward end of the blow pipe is attached adjacent a protruding end of the rotary manifold body. A needle valve arrangement mounted in the rotary manifold body controls the amount of combustible gas mixture fed from the mixing chamber to the blow pipe. A simple frame arrangement holds the mounting head and positions the cylinders of compressed gas in fixed relationship thereto.

It is an object of this invention to produce a miniaturized gas welding apparatus.

It is another object of this invention to produce a miniaturized self-contained welding apparatus in which small cylinders of compressed gas are used as fuel sources for a highly efficient source of localized, intense, high heat, thereby supplying a long felt need in the field of electronics, especially in micro-circuitry.

It is another object of this invention to provide a mounting head for a miniaturized gas welding apparatus which combines into one unit a number of heretofore separate units, including manifold means, valve seating means, gas mixing means, gas feed control means, etc.

It is another object of this invention to provide in a miniaturized gas welding apparatus a rotary gas manifold for positioning in a mounting head which, among other functions, maintains a constant rate of gas feed to a blow pipe independently of the position of the blow pipe within a 360-degree arc with respect to the axis of such rotary gas manifold.

It is another object of this invention to provide a combined cylinder-head puncturing and valve assembly for a mounting head in a miniaturized gas welding apparatus, which initiates and controls gas flow from compressed gas cylinders.

It is a further object of this invention to provide a frame for a miniaturized gas welding apparatus which will support a mounting head and maintain small cylinders of compressed gas in fixed relationship thereto.

Other and further objects of this invention will become apparent to those skilled in the art upon reading the attached specification.

The invention is better illustrated by reference to the attached drawings, in which:

FIG. 1 is a side elevational view of an embodiment of the invention;

FIG. 2 is an end elevational view of the apparatus shown in FIG. 1;

FIG. 3 is a top plan view of the apparatus of FIG. 1;

FIG. 4 is a vertical section of the apparatus of FIG. 1, taken generally along the line 4—4 of FIG. 1;

FIG. 5 is an enlarged vertical sectional view of the apparatus of FIG. 1 in the head region, taken along the line 5—5 of FIG. 1;

FIG. 6 is a horizontal cross-section of the head region of the apparatus shown in FIG. 1, taken along the line 6—6 in FIG. 1;

FIG. 7 is a diagonal section through the head region of the apparatus of FIG. 1, taken along the line 7—7 of FIG. 6.

FIG. 8 is a vertical cross-section through the head region of the apparatus of FIG. 1, taken along the line 8—8 in FIG. 2;

FIG. 9 is a vertical sectional view of the apparatus of FIG. 1 through its head region, taken along the line 9—9 of FIG. 3;

FIG. 10 is a side elevational view of a second embodiment of the invention;

FIG. 11 is an end elevational view of the apparatus of FIG. 10;

FIG. 12 is an enlarged vertical cross-section of the apparatus of FIG. 10, taken through the head region along the line 12—12 of FIG. 10;

FIG. 13 A, B and C, comprise a series of vertical cross-sections of the apparatus shown in FIG. 10, taken along the lines A, B and C, respectively, in FIG. 12;

FIG. 14 is a side elevational view of the rotary gas mixing valve used in the head region of the apparatus of FIG. 10.

In FIG. 1 is shown a preferred embodiment of the invention. A cylinder of compressed oxygen gas 70 and a cylinder of compressed combustible hydrocarbon gas 71 (such as acetylene, butane, or the like) are shown positioned in a frame 72. The head end 28 of cylinder 70 and the head end 29 of cylinder 71 are shown positioned in mounting head 73 and held in place by tightening adjustable clamping nuts 15 and 16, respectively. Each such clamping nut is composed of a cup 20, a thumb-screw 21, and a thumb-screw disc 22. Washer 23 serves as a loose-fitting retaining sleeve keeping cup 20 rotatably mounted on the end of screw 21.

Frame 72 is secured to mounting head 73 by means of screws 30 (see FIG. 2) and by means of support rod 31. Support rod 31 is threaded at each end and screws into the bottom center of mounting head 73 and, in turn, is bolted to the bottom center of frame 72 by means of nuts 34. Against the bottom surface of the frame 72 and over the support rod 31 is mounted a retaining clip 33.

As shown in FIG. 8, the face 61 on the head 28 of cylinder 70, and the face 62 on the head 29 of cylinder 71 are each placed in sealing contact with mounting head 73 using gaskets 35 and 36, respectively, such sealing contact being obtained by tightening clamping nuts 15 and 16, respectively. Observe that cylinder 71 (that containing compressed hydrocarbon gas) has an axially elongated neck region 24 which ends in a platform 53. This difference in construction aids in distinguishing between respective cylinders of compressed oxygen and compressed hydrocarbon when the same are otherwise unmarked.

As soon as cylinders 70 and 71 are seated and sealed in valve block 73, they can be punctured and made ready for use. The operation of the combined puncturing and needle valve assembly used in controlling gas flow from the individual cylinders is more particularly understood by reference to FIG. 8. As there shown, stem 49 is axially mounted on the screw 63. Screw 63 is rotatable by means of knob 48 positioned on top of the valve body 15. As knob 48 is turned clockwise, screw 63 lowers stem 49 into the face 61 of cylinder 70. As knob 48 continues to be turned, stem 46 is pressed into and eventually punctures face 61 of cylinder 70. This puncturing operation seats the frusto-conical section of the point of stem 49 in the adjoining or surrounding material constituting the face 61 of cylinder 70. Then by backing off stem 49 slightly by reversing the direction of rotation of knob 48, the control of gas escaping from the cylinder is regulated by needle valve action. Gas escaping from cylinder 70 enters channel 46 and passes into channel 38 so as to enter mixing chamber 41.

A similar readying procedure is used with respect to the other gas cylinder so as to initiate and control gas flow. Thus, stem 50, which is axially attached to the base of screw 64 is advanced by turning knob 52 clockwise, and lowered against the surface 62 of platform 53 upon head 29 of cylinder 71. Escaping gas passes into channel 14, through channel 39, and out into the mixing chamber 41.

The appearance of a cylinder and combined puncturing and needle valve assembly following puncturing is shown in FIG. 5. Here cylinder 70 has had its face 61 punctured by stem 49. Observe that stem 49, like stem 50, terminates in a frusto-conical valve seat engaging portion and an outwardly extending conical puncture portion or point axially extending from such valve seat engaging portion. The opposite sides of the frusto-conical valve seat engaging portion define a relatively wide included angle, by which is meant an angle less than 180 degrees but greater than 90 degrees. The opposite sides of the conical puncture portion define a relatively narrow included angle, that is an angle less than 90 degrees. After face 61 is punctured by the conical puncture portion or point of stem 49, stem 49 becomes seated against cylinder face 61 upon the frusto-conical valve seat engaging portion of stem 49. There is thus created a needle valve assembly which henceforth is used to regulate the flow of gas from cylinder 70. The terminal portion of stem 50 is constructed similarly to the terminal portion of stem 49, just described.

Within mounting head 73 (see FIG. 6) are channels 38 and 39 which provide passageways, respectively, for hydrocarbon and oxygen to pass from their respective cylinders 71 and 70 to the region of rotary manifold 40. Observe that manifold 40 is in the form of a cylindrically shaped shaft rotatably mounted in a central bore defined in the mounting head 73. The rotary manifold 40 is held in place by slip ring 51. The rotary manifold 40 and the above-noted puncturing and regulating devices are important features of the present invention since they provide an effective mixing of the hydrocarbon and oxygen gases. As an example, liquid butane is compressed at approximately 100 p.s.i., whereas the oxygen may be at 5000 p.s.i.; and the gases, at such a differential in pressure, are effectively regulated and mixed by the above-noted mechanism.

Rotary gas manifold 40 contains within it an axially extending mixing chamber 41 in which mixing of the gases is accomplished. To connect passageways 38 and 39 with mixing chamber 41 are provided channels 56 and 57, respectively, which are radially positioned in the manifold 40 so as to provide a continuous passageway from the cylinder head regions through passageways 38 and 39, and finally directly into mixing chamber 41. A pair of circumferentially extended, longitudinally spaced grooves 65 and 66, respectively, circumscribe the shaft of rotary manifold 40 at the point where channels 56 and 57 begin. It is this combination of grooves with the radial channels in the rotary manifold 40 which provides the constant delivery of gas to mixing chamber 41 from channels 38 and 39, respectively, regardless of the rotation of the manifold 40 (and hence to the blow-pipe, as will be seen from subsequent description). While only a pair of radial channels (56 and 57) are shown in the embodiment being described, it will be appreciated that a plurality of radial channels could be positioned about each spaced groove 65 and 66.

Annular gas sealing means are positioned adjacent the side of each groove (65 and 66) so as to prevent sidewise leakage of gases from channels 38 and 39 along the seating surface of manifold 40. As shown by FIG. 6, such annular gas sealing means is provided by notching cylinder 40 at 58, 59 and 60 and then placing in each such notch a suitably dimensioned conventional O-ring type sealing gasket.

Needle valve 45 in rotary manifold 40 controls the volume of mixed gas flowing from the mixing chamber 41 into blow-pipe 42. The needle valve 43 in effect controls the size of the flame which is produced at the nozzle 44 of blow-pipe 42 when the torch is in operation. This valve 45 is axially mounted upon the rotary manifold 40. A stem 26 and a seat 37 are so positioned at an end of mixing chamber 41 as to control egress of mixed combustible gases leaving mixing chamber 41. Combustible gas mixtures passing from mixing chamber 41 through needle valve 45 enter channel 68 and eventually pass into blow-pipe 42 (see FIG. 9).

Thus, when operating the gas welding apparatus shown in FIG. 1 and 2, knobs 48 and 52 control the flow, respectively, of gases to mixing chamber 41, and fuel valve 45 controls the flow of a combustible fuel mixture from mixing chamber 41 to blow-pipe 42.

Observe that the blow-pipe 42 is fastened adjacent a projected end of the rotary cylindrical manifold 40, as shown in FIG. 9. When it is desired to use the gas welding apparatus of this invention, one moves the blow-pipe 42 with its attached nozzle 44 off retaining clip 33. As blow-pipe 42 rotates, the rotory gas manifold body 40 also rotates. Blow-pipe 42 is rotatable in a vertical plane about the axis of rotary manifold 40. As those skilled in the art will appreciate, any conventional means for attaching blow-pipe 42 to the rotary gas manifold 40 can be employed within the spirit and scope of this invention, though here the blow-pipe 42 has a threaded rearward end which screws into the rotary manifold 40.

In FIG. 10 is shown a second embodiment of the apparatus of this invention. In this embodiment, an extension pipe 75 is fitted over the nozzle 44 of blow pipe 42. A series of holes 76 towards the rearward end of pipe 75 are so positioned and arranged that air is aspirated in through holes 76 by venturi action as hydrocarbon gas passes through nozzle 44 and out through the open end of pipe 75. The position of the pipe 75 when not in use is shown by solid lines in FIG. 10, and its position when in use is shown by dotted lines in FIG. 10. This extension pipe makes it possible to burn the hydrocarbon gas without oxygen, using air alone, if the user so desires.

In the embodiment shown in FIG. 10, the needle valve 80 is positioned in the end of a rotary manifold 87 adjacent the side where the blow-pipe is attached, instead of being positioned in the opposed end of the rotary manifold 87 as shown in the embodiment of FIG. 1. The needle valve for regulating mixed gas flow to the blow-pipe 42 in the embodiment of FIG. 10 is designated by the reference numeral 80. At the opposite or opposed end of this rotary manifold 87, is positioned an axially extended tube 82 whose outside circumferential walls seat against the inside walls of this mixing chamber 81. This tube 82 (see FIGS. 12 and 13) is rotatably mounted and has positioned in its side walls a pair of radial, longitudinally spaced holes or channels 83 which are so positioned as to be alignable with the radial channels 85 and 86 of the rotary manifold 87. When these channels 83 are aligned by rotation of the tube 82 with the channels 85 and 86, gas from each channel can flow into mixing chamber 81.

When, however, one desires to burn only hydrocarbon i.e. propane gas (which enters the mixing chamber 81 through channel 85; see FIG. 12), one rotates the tube 82 by means of knob 88 through an angle of 90 degrees. When this is accomplished, a channel 89 lines up with channel 85. Only one such channel 89 is provided in tube 82; hence, there is no means for ingress of oxygen into the mixing chamber 81 after the tube has been so rotated through 90 degrees. Thus, only propane is admitted to mixing chamber 81.

The situation is made clear in FIG. 13. Sections A and B show the position of channels 83 and 89 at channel 85, and the position of channel 83 at channel 86 when the mixing chamber is to receive both hydrocarbon and oxygen. The channels 83 are both in a vertical position. When, however, one desires only to admit hydrocarbon gas, the tube 82 is rotated 90 degrees and then only channel 89 is lined up with channel 85. In order to insure exact alignment of the channels in tube 82 with the channels 85 and 86 in rotary manifold 87, there is provided a set screw 90 which can travel in a groove 91' of tube 82, as tube 82 is rotated. This set screw 90 can be simply threaded in through an aperture 92' in valve 87.

The appearance of the rotary manifold body 87 is shown in the side elevational view of FIG. 14. As in the case with the rotary manifold 40, this rotary gas mixing valve 87 contains a pair of circumferentially extended, longitudinally spaced grooves 91 and 92, respectively, each circumscribing manifold 40. In the bottom of each groove and extending radially inwards therefrom towards the mixing chamber 81, is a channel (85 and 86, respectively, for grooves 91 and 92). Grooves 93, 94 and 95 are provided to receive O-rings 96, 97 and 98, respectively, which provide annual gas sealing means adjacent each side of grooves 91 and 92 to prevent escape of gases. Groove 99 is provided at the forward end for retaining ring 100 which serves to retain and hold rotary manifold 87 in axially fixed relationship to the head 73.

The embodiment shown in FIG. 10 has a valve shut-off means for preventing flow of the gases through channels 85 and 86, respectively, from the cylinders 71 and 70, respectively, and out through blow-pipe 42 when blow-pipe 42 is in the depending vertical position shown in FIG. 10. The advantage of this shut-off is that, after one has once regulated the flow of gas from the respective cylinders of oxygen and hydrocarbon at an optimum level, the thumb screw settings on the adjustable valve openings need not be changed when the apparatus is not operating. Thus, to cut off the flow of gases it is not necessary to touch the needle valve means actuated by knobs 52 and 48, respectively.

Details of this cut-off valve means are shown in FIG. 12. The diameter of channels 85 and 86 is made slightly larger than the width of channels 91 and 92, which are positioned parallel to the blow-pipe 42 in that wall of valve 87 which is opposite the place the blow-pipe 42 joins an extended end of manifold 87. Ball bearings 101 and 102 are chosen so as to have a radius of curvature which permits each to seat itself in gas tight relationship in the openings to channels 85 and 86 in grooves 91 and 92, respectively. These ball bearings 101 and 102 are mounted in the head 73 and run in grooves 91 and 92 as the rotary manifold 87 is rotated. The ball bearings 101 and 102 are maintained in contact with the rotary manifold 87 by means of thrust springs 103 and 104. Thus, whenever the rotary manifold 87 comes to a vertical position, the ball bearings 101 and 102 "clip" or drop into place over channels 85 and 86, respectively. Since ball bearings 101 and 102 seat over channels 85 and 86 in gas-tight relationship, flow of gas from the respective cylinders 70 and 71 into channels 85 and 86 is prevented, and, hence, gas flow to the blow-pipe 42 ceases. Hence, when one desires to use the apparatus after having previously set up optimum desired gas flow rates by regulating the various valves, there is no need to further adjust knobs 52 and 48, or to adjust the needle valve 80. All one needs to do is to move (rotate) the rotary manifold 87 and its attached blow-pipe 42 so as to remove ball bearings 101 and 102 from the mouths of channels 85 and 86.

Thrust springs 103 and 104 are retained in place by plate 106, phich is held at the top of the mounting head 73 by means of screw 107. Plate 106 also is employed in both the FIG. 1 embodiment and the FIG. 10 embodiment to hold pointers 108 and 109. These pointers, acting in combination with respective dials 112 and 111 (attached to the bases of knobs 52 and 43, respectively), enable one to fix with particularity the exact position of knobs 52 and 43, thereby aiding an operator to set up proper or desired gas flow rates for the apparatus.

Preferred materials of construction for the apparatus of this invention are usually metallic although, as those skilled in the art will appreciate, certain parts of this invention can be fabricated from plastics. In the mounting head, while the various channels can be plugged in their end regions by any conventional material, it is usually preferred to use sealing means which can be removed in order to permit cleaning of small passages. In this connection, note the manner in which frame 72 is fastened to the sides of block 73 in FIG. 6; here sealing means are placed between block 73 and frame 72. Also note that a filter 113 can optionally be inserted into pipe 42 to remove any possible solid contaminants.

No special construction need be used in fabricating the cylinders for use in holding the compressed fuel gases. It has been found convenient, however, to use those cylinders available commercially and sold by Walter Kidde Co. of Bloomfield, N.J.

In summary, from the foregoing description, it will be appreciated that the miniaturized gas welding apparatus of this invention comprises in its essential elements a mounting head assembly and a frame for holding the mounting head and positioning cylinders of compressed gases in fixed relationship thereto. The mounting head assembly includes seating means for the heads of cylinders of compressed gases, valve means for selectively regulating the flow of gases from each such cylinder head and seating means therefor, chamber means for mixing the oxygen and fuel gases, blow-pipe means so rotatably mounted on said head that fuel gases from said mixing chamber can be fed thereto at a substantially constant rate independently of the blow-pipe's position, valve means for controlling the quantity of fuel gases leaving said mixing chamber for said blow-pipe and seating means therefor, and channels for the passage of gases from said respective cylinder heads through said mixing chamber and into said blow pipe.

Considered as an assembly, the mounting head described herein contains (a) one assembly for initiating and controlling the flow of gases from each respective cylinder head (usually two in number), (b) a rotary manifold within which gases from each cylinder are admixed and then fed at a constant rate to a blow-pipe attached to said rotary manifold, and (c) a mounting block containing the necessary seats and passages.

Each assembly for initiating and controlling gas flow from the head of a cylinder of compressed gas contains a stem terminating in a frusto-conical valve seat engaging portion with an outwardly extending conical puncture portion axially positioned on top of such valve seat engaging portion, the opposite sides of said valve seat engaging portion defining a relatively wide included angle, and the opposite sides of said conical puncture portion defining a relatively narrow included angle, and means for axially extending and retracting said stem alternately into and out of the head surface of a cylinder which is to be punctured and formed into a valve seat.

The said rotary manifold comprises a cylindrically shaped shaft, an axially extending generally cylindrically shaped mixing chamber within said shaft, a pair of circumferentially extended, longitudinally spaced grooves circumscribing said shaft, at least one radial channel situated in each groove extending from the bottom therefrom into said mixing chamber, annular gas sealing means positioned adjacent each side of each groove, and valve means for controlling egress of gases leaving said mixing chamber and entering an exit channel leading mixed gases out of said valve.

The mounting block contains a cylindrical bore passing transversely through said head, a pair of spaced, generally parallel passages extending transversely through said head in a direction normal to the axis of said cylindrical bore and radially offset therefrom, one end of each parallel passage defining an annular seat portion, and fluid apertures separately interconnecting each parallel passage with said cylindrical bore.

While the embodiments above described employ a U-shaped frame member, it will be appreciated by those skilled in the art that any type of frame can be used for holding the mounting head and positioning cylinders of compressed gases in fixed relationship thereto. Indeed, it should be noted generally, that while the foregoing embodiments of apparatus of this invention described a preferred mode of practicing the invention, other and equivalent structures could likewise be used to produce gas welding torches within the spirit and scope of this invention, and I do not intend that my invention shall be limited to the particular embodiments and modifications thereof described herein.

What I claim is:

1. A miniature gas welding apparatus including cylinders of compressed gases and comprising:
   (a) a mounting head assembly comprising:
      (1) seating means for the heads of the cylinders of compressed gases,
      (2) valve means for selectively regulating the flow of gases from each such cylinder head,
      (3) manifold means for mixing the gases from the cylinders,
      (4) a blow pipe connected to said manifold means,
      (5) means mounting said blow pipe on said head for rotary movement to provide an ineffective position at one circumferential location and an operative condition at all other circumferential locations whereby gases from said mixing chamber may flow into the blow pipe at a substantially constant rate independently of the blow pipe's position in any of said other circumferential locations, and
      (6) channels for passage of gases from the respective cylinder heads through said mixing chamber and into said blow pipe, and
   (b) a frame for holding said mounting head and positioning the cylinders of compressed fuel gases in fixed relationship thereto.

2. The apparatus of claim 1 wherein the mounting head assembly includes a block which defines:
   (a) a cylindrical bore passing transversely through said head,
   (b) a pair of spaced passages extending through said head in a direction generally normal to the axis of said bore and radially offset therefrom, one end of each passage defining an annular seat portion, and
   (c) fluid apertures separately interconnecting each of said passages with said bore.

3. The apparatus of claim 1 wherein the manifold means of said mounting head assembly comprises:
   (a) a cylindrically shaped shaft,
   (b) an axially extending generally cylindrical mixing chamber within said shaft,
   (c) a pair of circumferentially extended longitudinally spaced grooves circumscribing said shaft,
   (d) at least one radial channel situated in each said groove extending into said mixing chamber, and
   (e) annular gas sealing means positioned adjacent each side of each groove.

4. The apparatus of claim 1 wherein the valve means of the mounting head assembly comprises:
   (a) a pair of stems, one for each of the gas cylinders, and each of said stems having a point portion adapted when a gas cylinder is held in position to puncture the head of the gas cylinder and form a valve seat therein, and
   (b) means mounting each of said stems in the mounting head assembly for axially extending and retracting movement of said stems alternately into and out of the respective cylinders when the same are held in position.

5. A mounting head assembly means for a miniature gas welding apparatus including retained cylinders of compressed gas and comprising:
   (a) a mounting block having a cylindrical bore passing transversely through said head, a pair of spaced generally parallel passages extending through said head in a direction generally to the normal to the axis of said bore and radially offset therefrom, one end of each passage defining an annular seat portion, and fluid apertures separately interconnecting each of said passages with said bore,
   (b) a rotary gas manifold in the form of a cylindrical shaft seated in the said bore, and defining an axially extending generally cylindrical mixing chamber within said shaft, and
   (c) a pair of combined puncturing and valve assemblies each one of which is positioned in a different one of said passages of said mounting block and having a stem defining a point portion adapted to puncture the head of the retained gas cylinder and form a valve seat therein, and each of said assemblies including means mounting said stem in the mounting head assembly for axially extending and retracting movements of said stem alternately into and out of the retained gas cylinder.

6. A miniature gas welding apparatus including cylinders of compressed gas and comprising:
   (a) a mounting head comprising a cylindrical bore extending transversely through said head, a pair of spaced generally parallel passages extending through said mounting head in a direction generally normal to the axis of said bore, the opposite ends of each of said parallel passages defining seating means for the head of a cylinder of compressed gas, and fluid apertures separately interconnecting said passages with said bore, (b) a rotary manifold seated in the said bore and defining an axially extending mixing chamber, (c) a cylinder head puncturing and valve assembly disposed in each of said passages in said mounting head for regulating the flow of gases from each respective cylinder of compressed gas, each of said assemblies comprising a stem terminating in a point portion adapted to puncture the head of the retained gas cylinder and form a valve seat therein, and (d) a frame secured to said mounting head and supporting the cylinders of compressed gases in fixed relationship thereto.

7. In a miniature gas welding apparatus including cylinders of compressed gas:

(a) a mounting head having passages adapted for connection with the gas cylinders and defining a transverse bore and fluid apertures leading to said bore from the passages adapted for connections to the cylinders, (b) a rotary gas manifold in the form of a cylindrical shaft seated in said bore, said manifold comprising:

(1) an axially extending generally cylindrical mixing chamber within said shaft, (2) a pair of circumferentially extending longitudinally spaced grooves circumscribing said shaft and each one communicating with a different one of said fluid passages, (3) at least one radial channel situated in each of said grooves and extending into said mixing chamber and defining a seat disposed at the groove end of said channel.

(c) a blow pipe communicating with said manifold, (d) means mounting said blow pipe with respect to said head for rotary movements to provide an ineffective or non-flow position at one circumferential location thereof and an operative gas flow condition at all other circumferential locations thereof whereby gas may flow into the blow pipe at a substantially constant rate independently of the blow pipe's position in any of said other circumferential locations, and (e) valve means associated with said manifold, said manifold, said valve means comprising a pair of ball elements each one received in a different one of the grooves of said manifold shaft and closing said radial channels leading into the mixing chamber when said blow pipe is in its said ineffective or non-flow position.

8. The structure defined in claim 7 in further combination with a second valve associated with said manifold and operative to shut off the gas flow from only one of said cylinders irrespective of the position of said blow pipe.

References Cited by the Examiner

UNITED STATES PATENTS

| 1,480,260 | 1/1924 | Haas | 158—27.4 |
| 2,400,658 | 5/1946 | Shepherd | 285—190 |
| 2,698,664 | 1/1955 | Freeman | 285—190 X |
| 2,850,041 | 9/1958 | Radanof | 137—616.7 X |
| 2,874,996 | 2/1959 | Zajac | 251—155 X |
| 2,875,777 | 3/1959 | Lacart | 137—318 |

FOREIGN PATENTS

| 918,257 | 9/1954 | Germany. |
| 461,654 | 2/1937 | Great Britain. |

FREDERICK L. MATTESON, JR., *Primary Examiner.*

MEYER PERLIN, JAMES W. WESTHAVER,
*Examiners.*